(No Model.)
J. MUNTON.
TIRE ROLLING MACHINE.
No. 309,082. Patented Dec. 9, 1884.
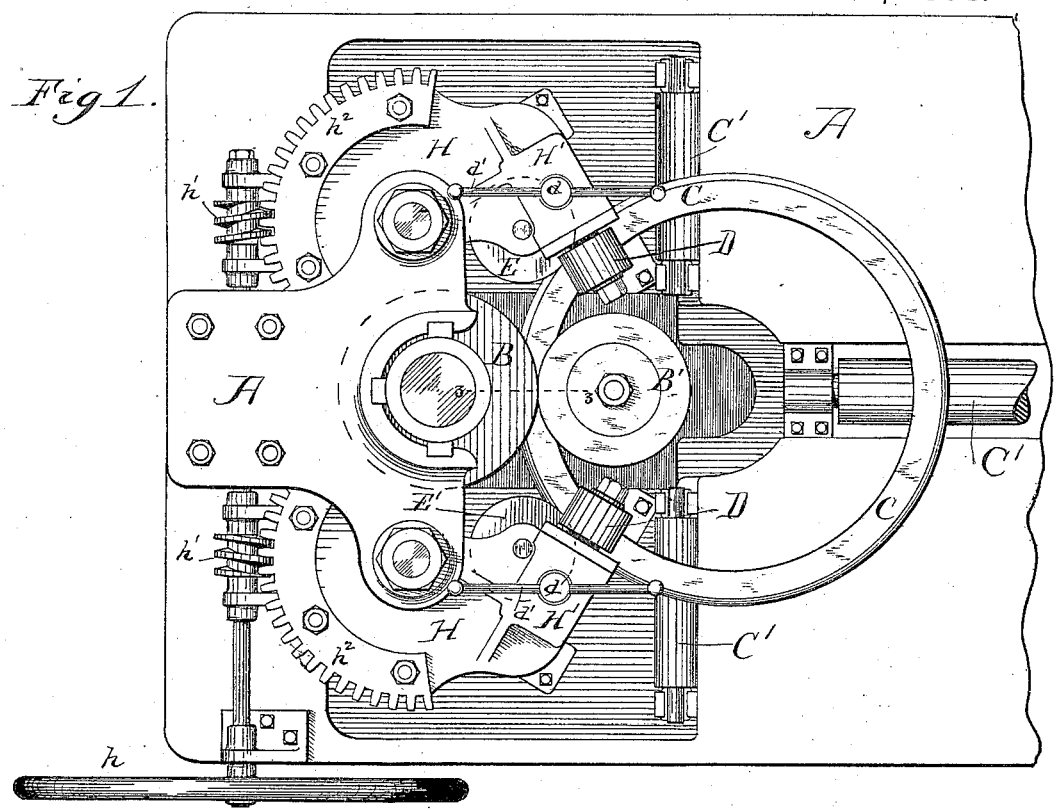
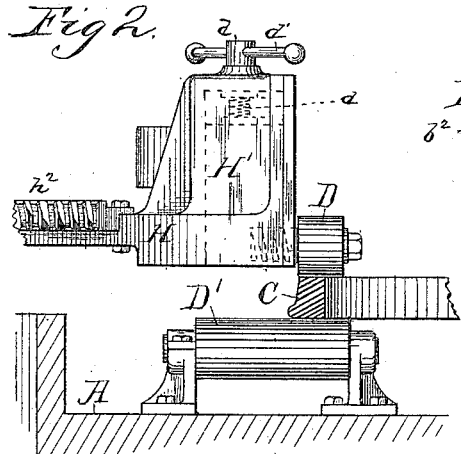
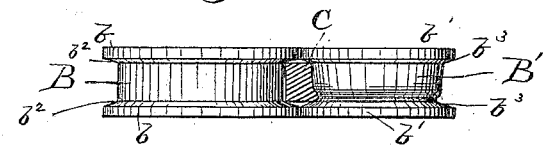
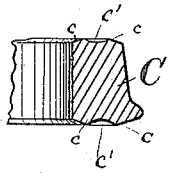
Witnesses:
Taylor E. Brown
H. M. Munday
Inventor:
James Munton
By Munday, Evarts & Adcock
his Attorneys

UNITED STATES PATENT OFFICE.

JAMES MUNTON, OF MAYWOOD, ILLINOIS.

TIRE-ROLLING MACHINE.

SPECIFICATION forming part of Letters Patent No. 309,082, dated December 9, 1884.

Application filed April 8, 1884. (No model.)

*To all whom it may concern:*

Be it known that I, JAMES MUNTON, a subject of the Queen of Great Britain, residing in Maywood, in the county of Cook and State of Illinois, have invented a new and useful Improvement in Tire-Rolling Machines, of which the following is a specification.

This invention relates to machines for rolling tires, and its object is to prevent fins being formed upon the tire as it is rolled.

Heretofore I have made tire-rolling machines which were provided with cutters or devices for removing these fins from the bottom and top edges of the tire while the tire was being rolled and as fast as they formed thereon; but I have discovered in the present invention that by slightly beveling the collars of the rolls and employing a pair of horizontal rolls to press against the edges of the tire no fin whatever will be formed upon either edge of the tire, as, owing to the bevel form of their collars, the main rolls will merely form at each revolution or passage of the tire between them slight ridges or projections on the edges of the tire, which ridges or projections are instantly pressed back by the horizontal rolls, and the edges of the tire rendered straight and smooth before again passing between the main rolls. In this way, no fins whatever being formed upon the tire, there is of course neither any waste of metal nor any labor required in their removal.

In the accompanying drawings, which form a part of this specification, Figure 1 is a plan view of a device embodying my invention. Fig. 2 is a side elevation of the horizontal rolls. Fig. 3 is a vertical section on line 3 3 of Fig. 1; and Fig. 4 is an enlarged cross-section of the tire, showing the form of the same after leaving the main rolls and before reaching the horizontal or smoothing rolls, the ridges or projections upon the edges of the tire being somewhat exaggerated for the purpose of better illustrating the same.

In said drawings, A represents the frame or bed of a tire-rolling machine, or of that portion of it to which my invention appertains.

B is the outer or fixed roll; B', the inner or movable roll; C, the tire, and C' the horizontal supporting-rollers upon which the tire rests and revolves. The rolls B and B' are box-rolls—that is to say, are both provided with collars or flanges $b\ b$ and $b'\ b'$, so that there can be no tendency of any fins to form at the corners of the tire. The inner edges of these collars or flanges $b\ b'$ have bevel-surfaces $b^2\ b^3$, which bevel-surfaces may extend back the full depth of the collars; or the inner part of the collar may be straight, while the outer portion only is beveled. As the tire C passes between the rolls having these bevel collars or flanges slight ridges $c$ will be formed upon its edges—usually two ridges or projections with a depression, $c'$, between them.

D and D' are the upper and lower horizontal rolls, which press against the edges of the tire and serve to force or press these little ridges $c$ back, and to render the edges of the tire straight and smooth. The lower rolls, D', are stationary, and are journaled in suitable bearings upon the frame of the machine, and serve also to support the tire the same as the rollers C'. The upper rolls, D, are mounted on the wings or pivoted segments H, so that they may be swung to and from the tire by means of the usual hand-wheel, $h$, and worm $h'$, which engages with the teeth $h^2$ of the segments. The rolls D are also adjustable vertically by means of the screws $d$, the bearings or boxes of said rolls being arranged to slide vertically in their housings H', in the ordinary manner. By means of the screws $d$, which are provided with suitable hand-levers, $d'$, the rolls D D and D' D' may be set so as to exert any desired degree of pressure upon the tire, or such as is necessary to keep its edges straight and smooth. It will of course be understood by those skilled in the art that heretofore in tire-rolling machines one or more upper rolls, D D, have been used to keep the tire down upon its supporting-rolls D' D' C'. E and E' are the vertical guide-rollers, mounted on the segments H in the usual way.

The degree of pressure required upon the horizontal rolls D and D' in order to obliterate the ridges $c$ and keep the edges of the tire straight and smooth is ordinarily not so great as to make it necessary to drive them; but one or more of the under rolls, D', may be driven, if preferred. In this way the tire is given a much smoother and finer finish upon its edges than can be produced in the old way, where fins are formed and have to be removed either during the process of rolling or after it is completed.

I am aware that heretofore horizontal rolls to bear upon the edges of the tire have been known or employed in connection with the usual main or vertical rolls, having either no collars or flanges at all, or else square collars or flanges, and I therefore disclaim the same as forming no part of my invention.

In my invention the main or vertical rolls have bevel collars or flanges, which perform the function of preventing the formation of a thin film or fin upon the edge of the tire, and of producing in place of such fin simply low swells, ridges, or enlargements on the surface of the edge of the tire, so that when rolls having such bevel-collars are combined with horizontal rolls pressing upon the edges of the tire said horizontal rolls will serve the function of pressing out such low swells or ridges, and thus rendering the edges of the tire again perfectly flat and smooth each time it passes between the main rolls.

It is obvious that if the construction of the main rolls is such as to produce upon the edges or corners of the tire a thin fin the operation of the horizontal rolls would tend simply to flatten it down upon the surface or edge of the tire, and not to force the metal of the fin back into the body of the tire, as is the case where low ridges or swells are produced upon the edges of the tire; and with such construction of the main rolls, therefore, my invention is not present either in form or mode of operation, nor is the new and useful result effected by it accomplished.

I claim—

1. In a tire-rolling machine, the combination of the rolls B B', having bevel collars or flanges, with horizontal rolls D D', to straighten and smooth the edges of the tire and prevent the formation of fins thereon as it is rolled, substantially as specified.

2. The rolls B B', provided with collars or flanges $b\ b$ and $b'\ b'$, having bevel-surfaces $b^2\ b^3$, substantially as specified.

JAMES MUNTON.

Witnesses:
H. M. MUNDAY,
EDMUND ADCOCK.